(12) United States Patent
Lefebvre

(10) Patent No.: US 8,176,415 B2
(45) Date of Patent: May 8, 2012

(54) METHOD FOR COMMUNICATING STRUCTURED INFORMATION

(75) Inventor: Michel Lefebvre, Vigoulet-Auzil (FR)

(73) Assignee: Systeam Sarl, Ramonville Saint Agne (FR)

( * ) Notice: Subject to any disclaimer, the term of this patent is extended or adjusted under 35 U.S.C. 154(b) by 555 days.

(21) Appl. No.: 10/524,728

(22) PCT Filed: Aug. 12, 2003

(86) PCT No.: PCT/FR03/02514
§ 371 (c)(1), (2), (4) Date: Jul. 29, 2005

(87) PCT Pub. No.: WO2004/017236
PCT Pub. Date: Feb. 26, 2004

(65) Prior Publication Data
US 2006/0059412 A1 Mar. 16, 2006

(30) Foreign Application Priority Data
Aug. 16, 2002 (FR) ..................... 02 10365

(51) Int. Cl.
G06F 17/24 (2006.01)
G06F 17/25 (2006.01)
(52) U.S. Cl. .................. 715/243; 715/221; 715/204
(58) Field of Classification Search .............. 715/517, 715/243, 221, 204
See application file for complete search history.

(56) References Cited

U.S. PATENT DOCUMENTS

| 5,251,294 | A | * | 10/1993 | Abelow | 715/236 |
| 5,381,523 | A | * | 1/1995 | Hayashi | 715/204 |
| 5,717,923 | A | * | 2/1998 | Dedrick | 707/102 |
| 6,070,175 | A | * | 5/2000 | Mezei | 715/500 |

(Continued)

FOREIGN PATENT DOCUMENTS

EP 1 304 630 A 4/2003

OTHER PUBLICATIONS

Kneece, Nancy S., "An Electronic Publishing Spectrum: A Framework for Text Modules", ACM, 1996, pp. 195-203.*

(Continued)

Primary Examiner — Doug Hutton, Jr.
Assistant Examiner — James Debrow
(74) Attorney, Agent, or Firm — Young & Thompson

(57) ABSTRACT

The method for communicating structured information, such as a report or an account, between a first user and at least one second user, includes a step of defining a document standard, which determines the general frame of the document in the form of a series of titles and/or conventional meanings and authorized values of certain conspicuous information fields. The transmitting user inputs data to be supplied incorporating a step of inputting text and/or titles as a supplement to the general frame and/or a step of selecting values on the conspicuous fields and transmitting data of the document addressed to the second user. Each recipient user selects a sorting criterion based on the titles or conspicuous fields. The document is then reorganized in accordance with the selected criterion and a step of supplying to the second user the document reorganized in accordance with the criterion.

20 Claims, 1 Drawing Sheet

U.S. PATENT DOCUMENTS

| | | | |
|---|---|---|---|
| 6,199,078 B1* | 3/2001 | Brittan et al. | 715/234 |
| 6,377,993 B1* | 4/2002 | Brandt et al. | 709/227 |
| 6,631,402 B1* | 10/2003 | Devine et al. | 709/217 |
| 6,754,677 B1* | 6/2004 | Cho et al. | 707/201 |
| 6,766,362 B1* | 7/2004 | Miyasaka et al. | 709/219 |
| 6,988,241 B1* | 1/2006 | Guttman et al. | 715/220 |
| 7,058,600 B1* | 6/2006 | Combar et al. | 705/34 |
| 7,171,448 B1* | 1/2007 | Danielsen et al. | 709/205 |
| 7,353,497 B2* | 4/2008 | Maresca et al. | 717/124 |
| 7,823,057 B1* | 10/2010 | Schultz et al. | 715/229 |
| 2002/0152245 A1* | 10/2002 | McCaskey et al. | 707/530 |
| 2003/0121006 A1* | 6/2003 | Tabata et al. | 715/513 |
| 2003/0187932 A1* | 10/2003 | Kennedy | 709/205 |
| 2003/0220905 A1* | 11/2003 | Amado et al. | 707/1 |
| 2005/0049971 A1* | 3/2005 | Bettinger | 705/51 |

OTHER PUBLICATIONS

Lewis et al.,"Shared Books: Collaborative Publication Management for an Office Information System", 1998, ACM, pp. 197-204.*

Holman, G. Ken, "Computer Aided Document Engineering", IBM Press, 1994, pp. 1-9.*

Jones et al., A User-Centred Approach to Functions in Excel, ACM, 2003, pp. 165-176.*

Tsai, S. R. et al, "A document workspace for collaboration and annotation based on XML technology" Internation Symposium on Multimedia Software Engineering, Dec. 11-13, 2000, pp. 165-172.

Baker, M. "Using Server Side XML to Crate Individual Web Pages" 1998 IEEE International Professional Communication Conference, Sep. 23, 1998.

* cited by examiner

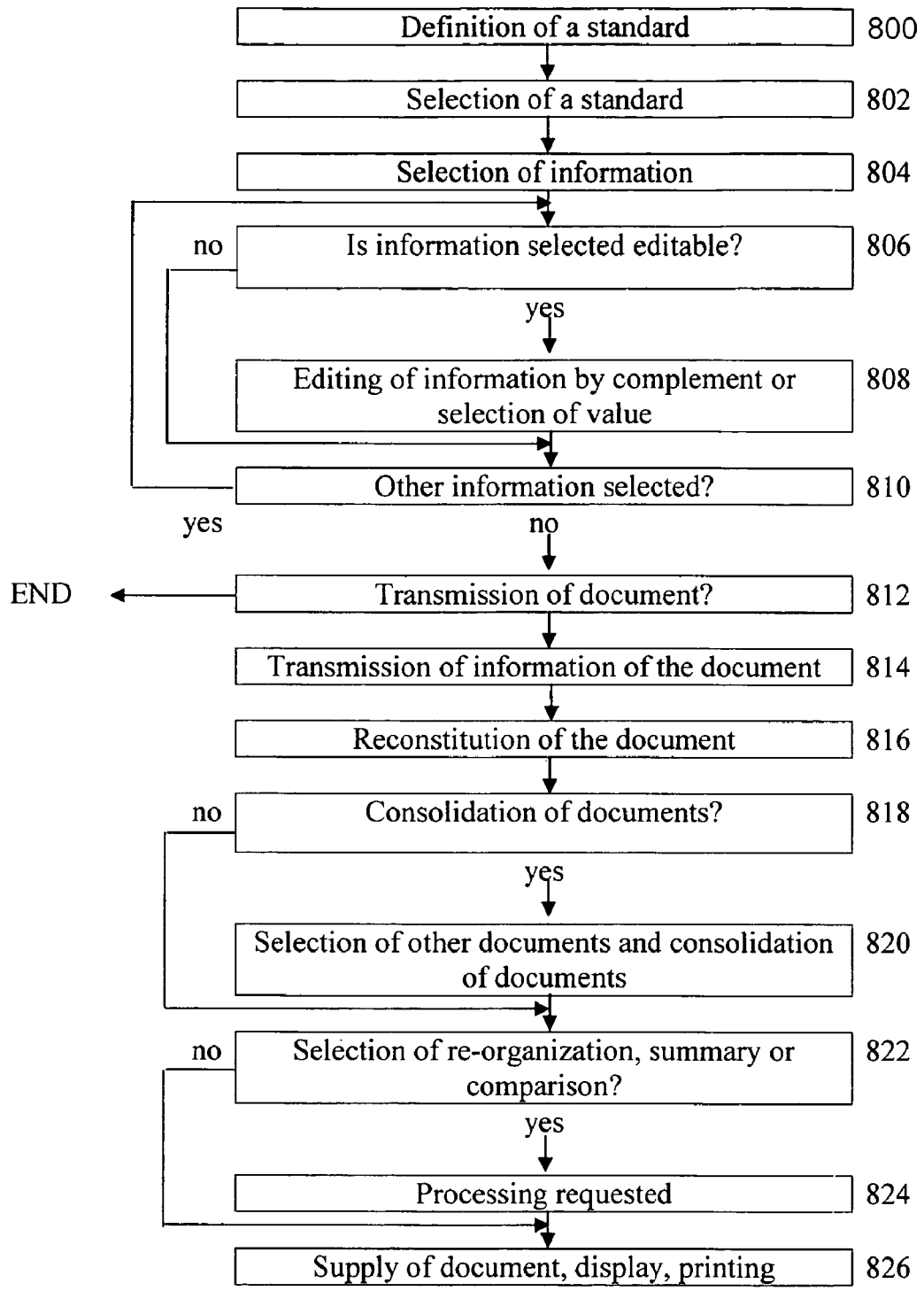

METHOD FOR COMMUNICATING STRUCTURED INFORMATION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention concerns a method for communicating structured information, notably by the generation, transmission and processing of files making it possible to generate documents. It applies, in particular, to the monitoring of activities using regular activity reports in a human organization, such as an industrial or administrative organization, or using meeting reports.

BACKGROUND OF THE INVENTION

In the following description, "reporting" is hereinafter used to refer to the communication of reports or statements between persons of the same organization, and, in particular, the communication of regular or routine statements. The reporting can be done in numerous ways:
  ascending or descending (relative to a hierarchy of decision levels),
  hierarchical or functional, oriented by "cost center" or profit center",
  individual, collective, or "circulating",
  periodic (from daily to annual), or at the occurrence of the particular events,
  more or less formalized.

A part of the reporting involves quantitative elements that can be produced in an automatic manner by an information system: costs, values, durations, trends, various indicators coming from ERP software (acronym of "Enterprise Resource Planning" for the planning of enterprise resources), CRM (acronym of "Consumer Relation Management" for management of the client relation), and other functional help tools for the organization. But most important is the reporting exchanged between two persons (or groups of persons), such that they can communicate in a regular manner in the context of their respective roles. It is spoken here of descriptions of facts, problems, requests, intentions, interpretations of numerical data ... etc, of all qualitative information which is necessary for the functioning of the human organization, and which in the end comprises expression and explanation.

Reporting is thus a significant function of any organization. This function, however, in the current state of the art, is both costly and poorly equipped, though it has benefited from bureaucratic provisions and electronic mail.

The technical problems that the present invention intends to solve involve the speed of the generation and supply of reporting information, on the one hand, and the quality and readability of the information transmitted between persons, on the other hand.

A report is costly to produce, in particular, because the editor spends a lot of time on the tasks of presentation, sorting, and page layout, instead of on the expression of content, and this regardless of the tool used. This increased cost for formatting slows the preparation and transmission of reports and thus impairs the speed of monitoring of the organization. This increased cost can also lead the editor to sacrifice content, simply because the editor devotes himself for a time, consciously or not, to this routine task. The quality of the information is thus affected.

The readability of these reports is a second technical problem that the present invention intends to resolve. In fact, even if the editor takes great care in the presentation of his report (to the detriment of the monitoring speed), this presentation often has need to be revised by the addressee depending on his own context, software and/or equipment (e-mail, printing driver, different page formats in the United States and in Europe, for example) from his choices or reading habits and from his own need to make a report of his activity, for himself or for others who, for their part will have to revise this report for their own needs.

The addressee of a report often has preferences on the presentation of information: in which order, with which level of detail, and according to which conventions they must be presented. But there is no practical way to encourage or facilitate the use of these standards by the issuers, apart from the implementation of a specific tool (text model or form), a costly and often ineffective solution because it is too rigid.

When these standards are defined, it is rare that they coincide with the ones that the issuer would naturally use. The points of view are different. For example, a worker would design his activity report in a sequential manner (according to the list of processed tasks), while his manager would want to see grouped on the one hand, the main results, and on the other hand, the points requiring his intervention. In this case, regardless of the quality of the applied standards, one of the two will be restricted, and constrained by a "translation" force.

The readability and usability of the reports are thus limited in the current state of the art.

The present invention intends to correct these disadvantages.

BRIEF SUMMARY OF THE INVENTION

For this purpose, the present invention intends, according to a first aspect, a method for communicating structured information, for example, a report or statement, between a first user and at least one second user, characterized in that it consists of:
  a step for defining a document standard, which determines the general framework of the document in the form of a series of titles and/or conventional notifications and values authorized by certain fields of noteworthy information;
  a step for inputting, by the first user, information to be provided incorporating a step for inputting text and/or titles as a supplement to the general framework and/or a step for selecting values on the noteworthy fields;
  a step for transmitting the information of the document from the first user to the destination of each secondary user;
  a step for selecting, by each secondary user, a sorting criterion based on the titles or the noteworthy fields;
  a step for re-organization of the document according to the selected criteria; and
  a step for supplying to the secondary user the document re-organized according to the criterion.

By these arrangements, the inputting of the report is agreeable to the first user, the sender, and frees him from formatting constraints, while conforming to the desires of each secondary user, or addressee, and containing all the information necessary for good communication between the users, using the implemented standardization.

In fact, the inputting of the report is agreeable for the first user, the sender, because it makes use of zones of text to enter, in a rather open manner, the content of information that corresponds to the titles defined by the standard of the document or by himself. By the definition of an interface, the sender is freed from the constraints of formatting. Moreover, since he can choose an automatic re-organization of the information, each secondary user renders the document according to his needs.

The implementation of a standard is a factor of mechanical effectiveness for the reporting process: on the one hand, it defines the common rules which must improve the quality and the completeness of the information, and makes everyone's reports so that they can be interpreted by all; on the other hand, it opens various possibilities for automatic processing, presented at a later point. But this does not restrict expression, nor does it reduce its human dimension. The personalization of the standards makes it possible to cover at the same time a large variety of professions or organizations, and various more or less precise and structured modes of reporting. The user can easily define them himself without any outside help.

One of the advantages of the present invention is to make this standardization attractive by maximizing its profit and minimizing its disadvantages.

It is understood that the implementation of the present invention makes the generation and use of information documents of the report or statement type pleasant, rapid, economical, and effective.

Moreover, if the addressee user makes use of a standard, the transmission of information can be limited to information that is different from what is defined in the standard, which reduces the consumption of resources for transmission and storage of document information. The present invention can thus allow, in variations, the information of a document to be compressed while allowing a large freedom for generation of documents and use of these documents.

According to the specific characteristics, during the step for inputting and/or during the step for supplying, in at least one zone of text, the titles defined by the standard and the text input by the user appear as a single line of text within the traditional ergonomics of the text processing. By these arrangements, each user is in a familiar environment for text processing.

According to the specific characteristics, during the step for defining the standard, for at least one title, a selection step is made if the title can be modified by the first user during the inputting step. By these arrangements, the document can, in certain cases, be integrally modified, for its textual part, by the user and transmitter, and in other cases, it can have titles suitable in advance which can not be modified.

According to the specific characteristics, during the step for inputting of the information, the first user can modify at least one part of the standard defined during the step for definition of the standard. By these arrangements, the flexibility of modification of the document is increased for the user and transmitter.

According to the specific characteristics, during the step for transmission, the information of the document is transmitted according to an accessible page format over an information network, readable using a web navigator and printable from any office work station equipped with a web navigator and a printer.

By these arrangements, the reception and use of the document can be done by any computer equipped with a navigator over the information network, for example, the internet.

According to the specific characteristics, the method as succinctly explained above comprises a step for consolidation of documents, during which the information of the documents which are linked to the same titles are juxtaposed under a unique title into different documents to be consolidated. Using these arrangements, the user and receiver can consolidate several documents to make a synthetic document and analyze the similarities and the differences between the documents which are transmitted to him.

According to the specific characteristics, the method as succinctly explained above comprises a step for determining a summary of the document, during which information is selected as a function of a hierarchy of information values. By these arrangements, the user and receiver can very rapidly comprehend the general content of the document.

Other advantages, goals, and characteristics of the present invention emerge from the description that follows, made with regard to the attached drawing, in which FIG. 1 shows an organizational diagram of the steps taken in a particular embodiment mode of the present invention.

The method that is the object of the present invention is preferentially implemented in the form of a software which can be downloaded or installed on a computer from a medium such as a diskette or compact disc. This computer generates files representing reports that can be transmitted to other computers by means of the media or the information network. In the particular embodiment modes, this computer is linked to the sources of the information, for example, databases or sensors of physical variables such as the time, product quantities, which supply information integrated into the report.

The method that is the object of the present invention makes possible simultaneously the implementation of a standardization of documents, and a personalization of the standard used. The tool that implements the method that is the object of the present invention is not "structuring". On the contrary, it integrates itself into an existing context (mode of work, office equipment, information system), even if this context is heterogeneous.

BRIEF DESCRIPTION OF THE SEVERAL VIEWS OF THE DRAWINGS

FIG. 1 shows a schematic view of an organizational diagram of the steps taken in a particular embodiment mode of the present invention.

DETAILED DESCRIPTION OF THE INVENTION

Before describing the drawing, a functional description of the steps for implementing the invention is given here.

I/ Data Model

The definition of a standard is supported by a data model. In fact, regardless of its type and its context, a reporting document, "report" or statement, may be characterized by:
a set of meta-data that defines the context, the type, the identity and the heading of the report:
name of the organization, periodicity, and role, addressee
sender(s), date and associated event, title
possibly, key words or other classification criteria a list of information elements (or "items"), which comprise the body of the report. These information elements can be hierarchical, with any number of levels, even if in practice it is rare to go beyond 2 or 3 levels of overlapping.

Each of these information elements is defined by:

an "author" (one who has defined or given information about the information elements involved). This attribute is found to be useful in the case of a collective or circulating report.

a "title" which characterizes the subject that is treated. In the case of hierarchical information elements, the title of an information element comprises a specification (a "sub-chapter") of information elements of an upper level.

a "priority" which characterizes the weight that the editor wishes to assign the information elements. It can represent, for example, a degree of importance (Routine, To Be Noticed, Critical), or a degree of urgency, or a combination of the two. But the use and the codification of this priority are by convention, and can vary from one context to another.

a "category" which characterizes either the type of information supplied by the information elements, or the area of concern to which the information element refers. For example, it indicates whether the status of a job, a problem, a request, an indicator, a contact, etc. is involved, and/or if a project, a team, methods, etc. are discussed. However, this is a non-restrictive list, the typology can be specific to the profession, the role or the functioning mode of the entity involved.

possibly, a scalar "value" (number, date, indicator of status, etc.), for which the format and the signification depend on the "type" or "domain" of the information element.

one or more paragraphs of free text, making it possible to detail the information as much as necessary.

It is noted that the information elements of all hierarchical levels are modeled in the same manner. Thus, an information element having a higher level (or intermediate level) in the hierarchy can be reduced to a "Title", but one may also consider it to be of interest to link a category or value to it, giving, for example, general information on the set of subjects that it covers.

II/ Definition of the Standard

The definition of the standard reflects the context in which the documents are exchanged, the objective of the documents, and the conventions used in order to describe useful information in them. Every editor can, if he or she desires, define his or her own standards for each document. But the standards only have real interest if they are applied by the group of contributors and in a relatively stable manner over time. In general, the standards will be thus defined by one of the users (or by a representative of them having the authority to do it), in order to be then applied by all the editors and for all the documents involved.

This definition is made using a specific function of the tool, for which the result is a "file for definition of the standard", an autonomous transportable file that can then be transmitted to the editors by common means.

The definition of a standard comprises four phases that can be executed in any order:

1/ The definition of the general attributes of the document that figure in an invariant manner in the heading of the documents: name of the addressee entity of the document and/or the upper level entity to which it pertains, code and title designating the function of the document (for example, "RHEBDO" and "Weekly Report"), periodicity or unit of dating the document ("DAY", "MONTH", TRIMESTER", "YEAR", "EVENT"), and possibly a list of addressees of the document (when it is fixed). The definition of these elements is done using one page of traditional dialog of the form type.

2/ The definition of "priorities", i.e. the values authorized for the "priority" field of the information elements of the document. The number of "priorities" is not limited, though in practice it is estimated that a number greater than 5 would present little interest.

Each of these "priorities" is defined in the file representing a document according to a standard, by:

a short alpha-numeric text (typically, less than 10 characters);

in an optional manner, an icon selected in the tool's library of icons. This icon can substitute for the text code of the priority in the visual representation of the document;

any number which will determine the sorting order of the information elements in the "by priority" view;

a Boolean (YES/NO) which determines whether an item having the priority involved must appear in the summary of the document;

a descriptive text, designed to recall to the editor of a document the conventional importance of this priority. This text will be presented to the editor during the selection of a priority.

The definition of the "priorities" is made using a display of the table type, by vertical scrolling, in which the user can directly insert or remove lines, and modify values of the field using the keyboard (for fields having an open value) or using selected dialog boxes (for the fields having a domain of limited values).

In the illustration given with regard to the tables below, the standard defines three priority levels:

"CRITICAL" code, "CRITICAL" icon, number 0,
"Note" code, "DANGER" code, number 5,
" " (blank) code, no icon, number 10.

3/ The definition of the "categories", i.e. the values authorized for the field "category" of the information elements of the document. The number of "categories" is not limited. Each of these "categories" is defined by:

a short alpha-numeric text (typically, less than 10 characters);

any number which will determine the sorting order of the information elements in the "by priority" view;

a Group name, which makes it possible to group several categories in a same section of the document during sorting "by category";

a Boolean (YES/NO) which determines whether an item having the category in question must appear in the summary of the document;

an indicator, chosen from ("NUMBER", "PERCENT", "SELECTION", "NONE", and "OPEN") which determines the type expected for the field "value" of the information elements having the category in question;

a Boolean (YES/NO) indicating whether the field "value" is required for the information elements having the category in question;

a descriptive text, designed to recall to the editor of a document the conventional importance of this priority. This text will be presented to the editor during the selection of a priority.

an optional list of "detail paragraph labels". For each of them, it can be specified if it can or can not be modified or removed by the editor;

when the indicator of the type of value is "SELECTION", a list of values possible for the Value attribute of the information elements having the category in question.

For each of these possible values, one defines:

a short text code (typically, less than 10 characters), in an optional manner, an icon selected in the tool's library of icons. This icon can substitute for the text code of the value in the visual representation of the document;

any number which will determine the secondary sorting order of the information elements in the "by priority" view;

a Boolean (YES/NO) which determines whether an item having the category in question must appear in the summary of the document;

a descriptive text, designed to recall to the editor of a document the conventional importance of this priority. This text will be presented to the editor during the selection of a value for an item having the category in question.

The definition of these five elements is done using a page of the specific dialogue containing:

a main table, by vertical scrolling, of the same principle as that of the "priorities", for the paragraph labels and the authorized values, two secondary scrolling tables for which the content is linked to the category selected in the main table.

In the drawing given in regard to the tables below, the standard defines six categories:

"general status" (GLOBAL group): The possible values are "GOOD", AVERAGE", and "BAD", and the associated icons represent respectively an arrow facing upwards, horizontal, and downwards;

"Job" (JOB group): The associated value is a percentage and an associated detail paragraph is named "Status";

"PB/Technique" (PROBLEMS group): No associated value and two associated detail paragraphs are named "Impact" and "Action";

"PB/Resources" (PROBLEMS group): No associated value and there is no specified detail paragraph;

"RQ/Act" (REQUESTS group): The possible values are "Rapp" (for "Reminder") and "URG" (for "urgent") and there is no specified detail paragraph;

"RQ/Meeting (REQUESTS group): The possible values are "Rapp" and "URG" (for "urgent") and there is no specified detail paragraph.

4/ The definition of a document framework, i.e. a list of information elements for which only the titles and the categories are defined. During the creation of a document according to the standard in question, this framework comprises the initial status of the document. The definition of this document framework is done exactly like the inputting of a document, except that:

the "value" field and the text of the detailed paragraphs can not be input, an additional command makes it possible to specify, for each information element, if it can or can not be removed and if its title and its category can or can not be modified during the editing of a document.

III/ Use of a Standard.

During the creation of a document, the selection of the standard to be applied is done by designation of a "standard file", either by a command parameter for starting the tool, or by pointing in a dialog box after the tool has been started.

The reader is reminded that the embodiment mode described and shown is based on a standard example (categories "General Status", "Job", etc., and associated classification groups) but that other standard examples can be implemented while remaining in the field of the present invention.

IV/ Creation of a Document

The creation of a document comprises:

An initial phase which consists in selecting a "standard file", by a dialog box. The program initializes the content of the document on the basis of the standard file selected, notably with the "document framework" defined by the standard, if there is one.

A definition phase of the various general attributes: name and initials of the editor, code and name of the entity to which he belongs or in the name of which he is writing, date (according to the unit of dating defined by the standard). These data can be keyed by the editor, but they can also be supplied automatically by the program, on the one hand, as a function of the current date, on the other hand, as a function of the identification data of the editor stored at his work station.

A phase for release of the content. This release of content is done by the inputting of the text, combined with the menu commands or buttons, according to a function that is very similar to that of a text processing software. Using the mouse and/or keyboard, the user can position the cursor at any position in the document in order to add or remove text, and select the portions of text (characters, words, paragraphs or whole items to change them or remove them.

With regard to the processing of the text, there is however, numerous differences, and, in particular, in a particular embodiment mode that is the object of a prototype, the following differences:

The selections of the formatting are reduced. There is no control for page setting, nor indentation, or numbering of the titles, these operations being done automatically and in real time by the program. With regard to the fonts used, the user can specify only the family and the size of the characters (applied globally to the document, for its visual or printable form), the other attributes (boldface, italics, spacing) being determined by the program according to the placement of the text;

The traditional editing commands "Cut/Copy/Paste" are limited: they can only involve the portions of the title, or the detail paragraphs, or one or more whole information elements;

There are specific commands taking into account the structured character of the text, in order to lower/raise the level of the title of an information element (i.e. combine their contents under the same title), transform a detail paragraph into an information element, modify the label of a detail paragraph;

The "priority" and "category" fields of each information element can be entered either via the keyboard, or by selection in a menu ("pop-up menu"). The same applies for the "value" field of information elements for which the category defines a finished list of possible values;

The "author" field is entered automatically, as a function of the computer and/or the open session on the computer, or the data supplied at the installation of the software that the present invention implements.

It is observed that the term "title" can apply to two things: on the one hand, the names of information elements (in the tables "Project ALPHA", "Project BETA"), on the other hand, the labels associated with detail paragraphs of an information element ("Status:"; "Impact:"). The first can be defined in the standard, in the form of a framework of the pre-defined report. The second ones are also defined in the standard, in the sense that they are associated with a "category", and that when this category is selected by the editor for information elements, the tool automatically creates one or more detail paragraphs with these labels. In the two cases, it is also the standard that determines whether these "titles" can be modified or not or removed by the editor.

The creation of a document ends with the saving of the document in the form of an XML file, to be sent to the addressees or for storage in anticipation of later modifications. Also, at any instant, one can generate an "image HTML" of the document, in the form of an HTML file, which can then be printed, transported or inserted into the body of an e-mail depending on the information infrastructure available to the user.

V/ Modification of a Document

The modification of an existing document is done simply by reloading the document file, preferably according to the XML language, received or saved during a previous session, then by the application of editing operations described above. However, there are some nuances which depend on the function options of the tool (selected during the command to start the program, or by dialog after starting):

One option makes it possible to protect (i.e. prevent the removal or modification of) all information elements whose author is another person than the one making the modification of the document.

One option makes it possible to preserve the track of the content before each modified information element, for the "category" and "value" fields, and to make the initial value of these fields appear, in addition to the modified value, with a particular design which highlights the modification.

One option makes it possible to consider the loaded document not as a document to be modified, but as a "model" which serves to initialize the content of a new document.

In its initial version that is the object of the prototype developed by the inventor, the method that is the object of the present invention is an autonomous executable, installed directly at the work station of the user (PC Windows, registered trademarks, and eventually, Linux, registered trademark). Each document is thus an independent file, structured in the XML format, and in this manner, displayable and printable by any Internet navigator equipped with the proper paper style. But, it is also possible to generate an HTML document in a totally self-sufficient manner. The report files (XML or HTML) can be transported by an electronic mail system of any type. The file that defines the standard, normally defined by the addressee of the reports, will be transmitted to the editors by the same means.

Eventually, another implementation of the method that is the object of the invention is designed to be integrated into the communication infrastructure of the users, in order to be directly accessible from their "collaborative" environment (MS-Outlook type or Lotus, registered trademark). The documents will then be objects managed by this infrastructure, under the title of "messages", "jobs", "rendezvous", etc.

The primary table, below, shows the structure of the data, according to the XML language as managed by the object method of the invention. In it, one observes a series of information elements, each information element being represented on a line and comprising the following fields:

"BF" which represents an incremental number for information inputting;

"Sign" which represents an identification of the author of the information element;

"Date" which represents the creation date or the last modification of the information element;

Three fields which represent the priority degree (in the sense defined in the data model) affected by the information element by the editor:

"Priority": text code appearing in the document,

"Priol": numerical value used in order to classify the information elements by priority, "Priolcon": name of the icon displaying the priority, as an alternative to the text code defined by "priority";

"Category" which represents the category of the information element (in the sense defined in the data model);

"C" which represents, in a numerical manner, the category indicated in the preceding column;

"CatGroup", which represents the category group in which the information element will be classed, during the reorganization "by category". This makes it possible to combine several "categories" in the same category group;

Three fields which represent the "value" (in the sense defined by the data model) linked to the information element by the editor:

"Cvalu": text representation (inputting), which can be a number or a text symbol, according to the category of the information element, "ValR": in the case of a non-numerical value, numerical expression of the value for sorting "by value";

"Valcon": name of the icon displaying the value, as an alternative to the text code defined by "Cvalu";

"Highlight" which shows the fact that the information element has been "highlighted" by the editor.

It is observed that the information elements of the second level are linked to projects that are information elements of the first level, by the hierarchy of "titles". In internal representation, the "title" of an information element is comprised of one or more elements, the ones shown in the secondary table at the bottom left (Tindex/PT). This "title" is always complete, i.e. it contains the title of the information elements "parents", i.e. the upper level of the information element involved. In the visual display of the document, these titles can appear, as a function of the sorting mode selected and/or the preferences of the user:

either in the complete form ("complete" titles), or in the incremental form (hierarchical titles).

The three tables at the bottom of the table below show "detail" tables (in the sense of the SGBD terminology), i.e. the structures of the list inside an information element pointed to by a pointer (placed here on line number 5), in the event of:

the list of elements having an upper level title (see above) of the information element in question, to the left, the list of "paragraph labels" of the information element in question, a paragraph being a title having a lower level, in the middle, for each paragraph of the information element in question, the list of lines of text of the paragraph, to the right.

| BR | Sign | Date | Priority | Priol | Priolcon | Category | C | CatGroup | CValu | ValF | Valcon | Highlight |
|---|---|---|---|---|---|---|---|---|---|---|---|---|
| 0 | ML | Aug. 08, 2002 | | 10 | | General Status | 1 | Global | Avg. | 1 | Aright | None |
| 1 | ML | Aug. 08, 2002 | | 10 | | Job | 2 | Jobs | 90% | −1 | | None |
| 2 | ML | Aug. 08, 2002 | | 10 | | Job | 2 | Jobs | 60% | −1 | | None |
| 3 | ML | Aug. 08, 2002 | Note | 5 | Danger | Pb/Tech | 3 | Problems | | −1 | | None |

-continued

| BR | Sign | Date | Priority | Priol | Priolcon | Category | C | CatGroup | CValu | ValF | Valcon | Highlight |
|---|---|---|---|---|---|---|---|---|---|---|---|---|
| 4 | ML | Aug. 08, 2002 | | 10 | | RQ/Meeting | 4 | Requests | Rapp | 1 | | None |
| >5 | ML | Aug. 08, 2002 | | 10 | | Job | 2 | Jobs | 20% | −1 | | None |
| 6 | ML | Aug. 08, 2002 | Critiqu | 0 | Critical | RQ/Act | 4 | Requests | Urg | 0 | | None |
| 7 | ML | Aug. 08, 2002 | | 10 | | Job | 2 | Jobs | 10% | −1 | | None |
| 8 | ML | Aug. 08, 2002 | | 10 | | Job | 2 | Jobs | 0% | −1 | | None |
| 9 | ML | Aug. 08, 2002 | Critiqu | 0 | Critical | PB/Resources | 3 | Problems | | −1 | | None |
| 10 | ML | Aug. 08, 2002 | | 10 | | General Status | 1 | Global | Good | 0 | Arup | None |
| 11 | ML | Aug. 08, 2002 | | 10 | | Job | 2 | Jobs | 20% | −1 | | None |
| Tindex | PT | | | | Project | DetTitle | P | | | | | |
| >1 | | Project Alpha | | | | Status | | This text explains the advancement of the job "Financing" of the project | | | | |

Concretely, the method that is the object of the present invention allows a standardization along three themes:

The definition of the various "categories", in the sense of the model described above. These categories must represent the different types of information elements that one would like to be able to use as a sorting or grouping theme. For each information element of the report, the editor must choose one of these categories. This choice can condition the format of the "value" field, and automatically create paragraphs of text with pre-defined labels, or titles, in order to orient the editor.

the codification of the "priority" (in the sense described above), in a graphical, symbolic or numbered manner. The standard will be freely defined and in as many degrees as necessary in giving them the conventional signification best adapted to the context.

Possibly, the definition of a framework of content, in the form of a "summary" (list of information elements, hierarchical or not). The editor can enter this framework, but also modify it or complete it as he pleases.

The automatic formatting help can appear to be a superficial characteristic, but its functions will be the first ones observed by the users, and they play an important role in the communication of the reports:

Free the editor completely from all constraints customary in formatting text: heading, numbering, indentation, graphics emphasis, and page layout.

Automatically produce an agreeable and effective visual appearance, which adapts itself to the work environment (screen and printer) of the sender and addressee.

Make easier the input of the data using the selection lists or other functions for assistance in inputting, directly exploiting the standards defined by the addressee.

While preserving ergonomics and flexibility of traditional linear text processing (as opposed to a form), in which the user has all freedom of expression beyond standards, and always sees a "printable" result.

As shown in the second to eighth tables, above, using the method that is the object of the present invention, the addressee of a series of reports can immediately do three jobs:

The individual chronological monitoring of each report: the jobs in progress are they progressing normally, are the problems regulated, what are the new elements, . . . etc. It is in this exercise that a manager can detect hidden problems, which the sender himself may not be aware of: abnormal deviations, chronic dysfunction, useless efforts, etc.

The "consolidation" or "concatenation" of the different reports, notably when several senders have contributed to the same business and each gives his point of view and added value. Within a team, this job is the key to the coordination and the resolution of local conflicts. For its relations with the outside, it gives a manager a complete and reliable vision of the business handled.

The synthesis, an often intuitive exercise in which everyone applies his personal criteria. Very often, for a hierarchical manager, this involves identifying, on the one hand, the points which require his intervention, on the other hand, those points likely to be of interest to his upper level manager. From that he will derive his action priorities and his own reporting.

In the second table below, a first example is observed of the presentation of a first document organized by subject, as appears on a computer screen. This presentation is displayed here by an Internet navigation software program such as Internet Explorer (registered trademark of Microsoft Corp., registered trademark), it is similar to the one displayed by the program implementing the method that is the object of the present invention, itself in the phases of editing or consulting of the document. The document contains meta-information, an indication of the organization of the presentation of the document, here "view by subject" and eleven zones for giving information elements, the first nine, at the top of the page, involving the subject "BETA project", based on organization by subject indicated by the notice "view by subject". Each information element corresponds to a horizontal zone which extends into all zones of the subject involved.

The meta-information contains a company name "Systeam" and the department, abbreviated: "DT" and in full: "Technical Management" to which the editor belongs, the name of the abbreviated report "TEST" and in full: "Test report", the date or subject of the abbreviated report "W28" and in full: "week 28", and the sending entity or the one involved, abbreviated "BRDEV", and in full: "Group Project Beam-Report".

To the left, the zones for information each contain two columns. In the column that is furthest to the left, the author of the information element is indicated, in the form of initials, here "ML". This information comes from the field "Sign" shown in the table above. In the one of the two columns which is furthest to the right, the degrees of urgency and priority are shown, an absence of information indicating that there is no particular urgency, an exclamation point (not shown in the table) in a triangle indicating that there is a moderate urgency and an exclamation point in bold (not shown in the tables) in a square indicating a high degree of urgency, danger or priority. This information comes from the field "Priority" or "Priol" shown in the first table above.

In the center, the information zones, the most extended in width since they cover more than half of the width of the page, contain elements in boldface, called "titles" which can or can not be modified by the user according to the standard applied, and elements in thin characters that the user can edit, i.e. modify by typing text, copying, pasting, cutting.

In the second table below, one observes that the titles and the information supplied or edited by the user only form a single continuous text without a separator, frame, horizontal line. The titles form titles and subtitles and the information supplied by the user of the text body. The user thus finds himself in a familiar environment of text processing.

To the right of the central information zones, the category of information element is indicated in the form of frames containing, for example, the terms "General Status" corresponding to the term "global" in the field "CatGroup" shown in the first table above, "Job", Rq Meeting" corresponding to the term "Request" or "Pb Technique" corresponding to the term "Problem". Finally, at the extreme right of the pages, information zones are located which, according to the document standard, contain icons in the form of arrows when the information element has the term "General Status" in the zone to the immediate left, indications of the percentage when, in the zone immediately to the left, the term "Job" or terms such as "Rep" or "Urg" are located which come from the field "CValu" shown in the above table.

It is understood that the arrow indicates the general progression of the subject involved while the percentages indicate the degree of realization of the corresponding job.

By a simple main menu command of the software implementing an embodiment mode of the method that is the object of the invention or by a mouse click on the title of the corresponding column, it is possible to re-organize the sequence of information elements to the request, as a function of a specified sorting and grouping theme:

- by "subject". It is often in this form that the report will be initially input, but this is not mandatory.
- by "category", with the possibility for secondary sorting according to the "value".
- by "priority".
- by "author" (for example, for a collective or circulating report).
- on a personalized criteria, based on a complex combination of these fields.

The display of the "titles" is modified as a result: once an information element is detached from the hierarchical upper-level information element, its title must be completed in order to position it in an absolute manner.

Below, a second example is shown of the presentation of the first document shown above, but re-organized by category, as it would appear on a computer screen. This presentation is also displayed here by an Internet navigation soft-

| File | Edition | Display | Favorite | Tools | ? |
|---|---|---|---|---|---|
| SYSTEAM | | | | Technical Management DT | |
| Report | TEST | Test Report | | | |
| Object | W28 | Week 28 | | | |
| From: | BRDEV | Group Project Beam Report | | | |

Notes: View by SUBJECT

PROJECT ALPHA

| | | | | |
|---|---|---|---|---|
| ML | | 1. Project ALPHA<br>This text explains the general status of project ALPHA, from the point of view of ML | General status | Δ |
| ML | | 1.1 Development<br>Status: This text explains the progress of the job "development" of the project ALPHA | Job | 60% |
| ML | Δ | > Bug in XML function interface<br>Impact: This text describes the consequences of the problem "Bug in the XML function interface" | PB/Technical | |
| ML | | Use of a different supplier?<br>This text proposes a meeting date to examine a proposal for a solution to the problem "Bug in XML function interface" | RQ/Meeting | Rapp |
| ML | | 1.2 Financing<br>Status: This text explains the progress of the job "financing" of the project ALPHA | Job | 20% |
| ML | ☐ | > Start over Devis Industrialization<br>This text states the reason for action demanded from the addressee of the report | RQ/Act | URG |
| ML | | 1.3 Marketing | Job | 10% |
| ML | | > Contact Distributor<br>Status: This text explains the progress of the job "marketing" of the project ALPHA | Job | 0% |
| ML | ☐ | > General delay<br>This text emphasizes the delay in the marketing jobs, attributing the cause to the lack of qualified human resources and specifies the need to be met | PB/Resources | |

PROJECT BETA

| | | | | |
|---|---|---|---|---|
| ML | | 2. Project BETA<br>This text explains the general status of project BETA, from the point of view of ML | General status | H |
| ML | | 2.1 Definition of the Product<br>Status: This text explains the progress of the job "definition of the product" of the project BETA | Job | 20% | ware program. The document contains meta-information, an indication of the organization of the presentation of the document, here "view by category" and eleven zones for giving information elements, the first two, at the top of the page, involving the category "Global", the five following, the category "Jobs", the next two the category "Problems", and the last two at the bottom of the page the category "Request", according to the organization by category indicated by notice "view by category". Each information element corresponds, here as well, to a horizontal zone which extends into all zones of the subject involved.

It is observed that the information elements are strictly identical to those in the table above, except that:
- their order of presentation, in the vertical direction, has been modified.
- the titles have been completed in order to show the complete filiation of each information element, since it is no longer visible in the order of presentation.

Below, a third example is shown of the presentation of the first document shown above in the two previous tables, but re-organized by priority, as it would appear on a computer screen. This presentation is always displayed here by an Internet navigation software program. The document contains meta-information, an indication of the organization of the presentation of the document, here "view by priority" and eleven zones for giving information elements, the first two, at the top of the page, involving the highest priority indicated in the fields "Priority" or "Priol" shown in the first table above, the next one, moderate priority corresponding to notices and the last eight at the bottom of the page, the lowest priority, according to the organization by category indicated by the notice "view by priority". Each information element corresponds, here as well, to a horizontal zone which extends into all zones of the category involved.

| File | Edition | Display | Favorite | Tools | ? | | |
|------|---------|---------|----------|-------|---|---|---|
| SYSTEAM | | | | Technical Management DT | | | |
| Report | TEST | Test Report | | | | | |
| Object | W28 | Week 28 | | | | | |
| From: | BRDEV | Group Project Beam Report | | | | | |

Notes: View by CATEGORY

| | | GLOBAL | | | |
|---|---|---|---|---|---|
| ML | | 1. Project ALPHA<br>This text explains the general status of project ALPHA, from the point of view of ML | | General status | Δ |
| ML | | 2. Project BETA<br>This text explains the general status of project BETA, from the point of view of ML | | General status | H |

| | | JOBS | | | |
|---|---|---|---|---|---|
| ML | | 3. Project ALPHA - Development<br>Status: This text explains the progress of the job "development" of the project ALPHA | | Job | 60% |
| ML | | 4. Project ALPHA - Financing<br>Status: This text explains the progress of the job "financing" of the project ALPHA | | Job | 20% |
| ML | | 5. Project ALPHA - Marketing | | Job | 10% |
| ML | | 6. Project ALPHA - Marketing - Contact Distributor<br>Status: This text explains the progress of the job "marketing" of the project ALPHA | | Job | 0% |
| ML | | 7. Project BETA - Definition of the Product<br>Status: This text explains the progress of the job "definition of the product" of the project BETA | | Job | 20% |

| | | | PROBLEMS | | |
|---|---|---|---|---|---|
| ML | Δ | | 8. Project ALPHA - Development - Bug in XML function interface<br>Impact: This text describes the consequences of the problem "Bug in the XML function interface" | PB/Technical | |
| ML | ☐ | | 9. Project ALPHA - Marketing - General delay<br>This text emphasizes the delay in the marketing jobs, attributing the cause to the lack of qualified human resources and specifies the need to be met | PB/Resources | |

| | | | REQUESTS | | |
|---|---|---|---|---|---|
| ML | | | 10. Project ALPHA - Development - Bug in XML function interface - Use of a different supplier?<br>This text proposes a meeting date to examine a proposal for a solution to the problem "Bug in XML function interface" | RQ/Meeting | Rapp |
| ML | ☐ | | 11. Project ALPHA - Financing - Start over Devis Industrialization<br>This text states the reason for action demanded from the addressee of the report | RQ/Act | URG |

It is observed that the information elements are strictly identical to those in the table above, but their order of presentation, in the vertical direction, has been modified.

| File | Edition | Display | Favorite | Tools | ? |
|---|---|---|---|---|---|
| SYSTEAM | | | | Technical Management DT | |
| Report | TEST | Test Report | | | |
| Object | W28 | Week 28 | | | |
| From: | BRDEV | Group Project Beam Report | | | |

Notes: View by PRIORITY

CRITICAL

| | | | | | |
|---|---|---|---|---|---|
| ML | ☐ | 1. Project ALPHA - Marketing - General delay<br>This text emphasizes the delay in the marketing jobs, attributing the cause to the lack of qualified human resources and specifies the need to be met | PB/Resources | | |
| ML | ☐ | 2. Project ALPHA - Financing - Start over Devis Industrialization<br>This text states the reason for action demanded from the addressee of the report | RQ/Act | URG | |

NOTICES

| | | | | | |
|---|---|---|---|---|---|
| ML | Δ | 3. Project ALPHA - Development - Bug in XML function interface<br>Impact: This text describes the consequences of the problem "Bug in the XML function interface" | PB/Technical | | |
| ML | | 4. Project ALPHA<br>This text explains the general status of project ALPHA, from the point of view of ML | General status | Δ | |
| ML | | 5. Project BETA<br>This text explains the general status of project BETA, from the point of view of ML | General status | H | |
| ML | | 6. Project ALPHA - Development<br>Status: This text explains the progress of the job "development" of the project ALPHA | Job | 60% | |
| ML | | 7. Project ALPHA - Financing<br>Status: This text explains the progress of the job "financing" of the project ALPHA | Job | 20% | |
| ML | | 8. Project ALPHA - Marketing | Job | 10% | |
| ML | | 9. Project ALPHA - Marketing - Contact Distributor<br>Status: This text explains the progress of the job "marketing" of the project ALPHA | Job | 0% | |
| ML | | 10. Project BETA - Definition of the Product<br>Status: This text explains the progress of the job "definition of the product" of the project BETA | Job | 20% | |
| ML | | 11. Project ALPHA - Development - Bug in XML function interface - Use of a different supplier?<br>This text proposes a meeting date to examine a proposal for a solution to the problem "Bug in XML function interface" | RQ/Meeting | Rapp | |

In the table below, the same elements will be observed as in the second table above, with, at the bottom of the page, a summary which only contains the titles of the information elements that have a high priority or "General Status" in the second table above.

The method that is the object of the invention makes it possible to automatically generate a summary comprised of a selection of information elements present in condensed form, i.e. without the detailed paragraph of text.

The information elements are selected as a function of the "priority" which is allocated to them by the editor (the presence or not of a "priority" in the summary being defined by the standard). Also, it is possible to force the appearance of certain "categories" in the summary.

| File | Edition | Display | Favorite | Tools | ? |
|---|---|---|---|---|---|
| SYSTEAM | | | | Technical Management DT | |
| Report | TEST | Test Report | | | |
| Object | W28 | Week 28 | | | |
| From: | BRDEV | Group Project Beam Report | | | |

Notes: View directly with SUMMARY

| | | | | |
|---|---|---|---|---|
| ML | | 1. Project ALPHA<br>This text explains the general status of project ALPHA, from the point of view of ML | General status | Δ |

-continued

| | | | | |
|---|---|---|---|---|
| ML | | 1.1 Development<br>Status: This text explains the progress of the job "development" of the project ALPHA | Job | 60% |
| ML | Δ | > Bug in XML function interface<br>Impact: This text describes the consequences of the problem "Bug in the XML function interface" | PB/Technical | |
| ML | | Use of a different supplier?<br>This text proposes a meeting date to examine a proposal for a solution to the problem "Bug in XML function interface" | RQ/Meeting | Rapp |
| ML | | 1.2 Financing<br>Status: This text explains the progress of the job "financing" of the project ALPHA | Job | 20% |
| ML | ☐ | > Start over Devis Industrialization<br>This text states the reason for action demanded from the addressee of the report | RQ/Act | URG |
| ML | | 1.3 Marketing | Job | 10% |
| ML | | > Contact Distributor<br>Status: This text explains the progress of the job "marketing" of the project ALPHA | Job | 0% |
| ML | ☐ | > General delay<br>This text emphasizes the delay in the marketing jobs, attributing the cause to the lack of qualified human resources and specifies the need to be met | PB/Resources | |
| ML | | 2. Project BETA<br>This text explains the general status of project BETA, from the point of view of ML | General status | H |
| ML | | 2.1 Definition of the Product<br>Status: This text explains the progress of the job "definition of the product" of the project BETA | Job | 20% |

SUMMARY

| | | | | |
|---|---|---|---|---|
| ML | | A. Project ALPHA | General status | Δ |
| ML | | B. Project ALPHA - Development - Bug in XML function interface - Use of a different supplier? | RQ/Meeting | Rapp |
| ML | ☐ | C. Project ALPHA - Financing - Start over Devis Industrialization | RQ/Act | URG |
| ML | ☐ | D. Project ALPHA - Marketing - General delay | PB/Resources | |
| ML | | E. Project BETA | General status | H |

In the table below, it will be observed a second document, organized by subject. It will be observed that the standard used for the two examples of documents consists of a pre-specified framework which is limited to the highest level titles "Project ALPHA" and "Project BETA", the titles or labels of the information elements of the lower levels being entirely defined by the editors. In other examples, several hierarchically ordered levels of titles or labels can be defined by the standard and can be modified or not by the editor.

| File | Edition | Display | Favorite | Tools | ? |
|---|---|---|---|---|---|
| SYSTEAM | | | | Technical Management DT | |
| Report | TEST | Test Report | | | |
| Object | W28 | Week 28 | | | |
| From: | BREXP | Group Audit Beam Report | | | |

Notes: View by SUBJECT

PROJECT ALPHA

| | | | | |
|---|---|---|---|---|
| JPL | 1. Project ALPHA<br>This text explains the general status of project ALPHA, from the point of view of JPL | General status | H |
| JPL | 1.1 Definition of the Product<br>Status: This text explains the progress of the job "definition of the product" of the project ALPHA according to JPL | Job | 100% |
| JPL | 1.2 Development<br>Status: This text explains the progress of the job "development" of the project ALPHA according to JPL | Job | 50% |
| JPL | > Problem XML interface<br>This text explains JPL's solution to the problem "XML interface" | PB/Technical | |
| JPL | 1.3 Marketing<br>Status: This text explains the progress of the job "marketing" of the project ALPHA according to JPL | Job | 20% |

-continued

| PROJECT BETA | | | |
|---|---|---|---|
| JPL | 2. Project BETA | General status | H |
| JPL | 2.1 Marketing | Job | 60% |
| | Status: This text explains the progress of the job "marketing" of the project BETA according to JPL | | |

In the table below, the consolidation of the documents will be observed shown in the second and sixth (the previous one) table above. The information elements coming form the first and the second report are sorted and juxtaposed after the title and subtitles which are common to them.

The method that is the object of the present invention makes it possible to merge several reports simply by compiling the information elements of the different original reports after each title that they have in common. It is observed that the numbering of the titles or labels is generated automatically by the software implementing the method that is the object of the present invention depending on the effective sequence of the information elements in a given report. It has only a "visual" role.

The "consolidation" here is a simple juxtaposition of reports. It takes on its full meaning during the sorting (for example, by subject), being understood that when several information elements of several reports have the same hierarchy of "titles", they are merged and presented under this hierarchy of "titles" with a unique number.

Once this consolidation of reports is done, the result can be subjected to the different processing presented above:

re-organization (for a consolidation by subject, by category or by priority), summary (total of the summaries of the original reports), comparison (relative to a previous consolidation).

| File | Edition | Display | Favorite | Tools | ? |
|---|---|---|---|---|---|
| SYSTEAM | | | | Technical Management DT | |
| Report | TEST | Test Report | | | |
| Object | W28 | Week 28 | | | |
| From: | BRDEV | Group Project Beam-Report (ML) | | | |
| | BREXP | Group Audit Beam Report (JPL) | | | |

Notes: View by SUBJECT

PROJECT ALPHA

| | | | | | |
|---|---|---|---|---|---|
| ML | | 1. Project ALPHA | | General status | Δ |
| | | This text explains the general status of project ALPHA, from the point of view of ML | | | |
| JPL | | | | General status | H |
| | | This text explains the general status of project ALPHA, from the point of view of JPL | | | |
| ML | | 1.1 Development | | Job | 60% |
| | | Status: This text explains the progress of the job "development" of the project ALPHA | | | |
| JPL | | | | Job | 50% |
| | | Status: This text explains the progress of the job "development" of the project ALPHA according to JPL | | | |
| ML | Δ | > Bug in XML function interface | | PB/Technical | |
| | | Impact: This text describes the consequences of the problem "Bug in the XML function interface" | | | |
| ML | | Use of a different supplier? | | RQ/Meeting | Rapp |
| | | This text proposes a meeting date to examine a proposal for a solution to the problem "Bug in XML function interface" | | | |
| JPL | | > Problem XML interface | | PB/Technical | |
| | | This text explains JPL's solution to the problem "XML interface" | | | |
| ML | | 1.2 Financing | | Job | 20% |
| | | Status: This text explains the progress of the job "financing" of the project ALPHA | | | |
| ML | ☐ | > Start over Devis Industrialization | | RQ/Act | URG |
| | | This text states the reason for action demanded from the addressee of the report | | | |
| JPL | | 1.3 Definition of the Product | | Job | 100% |
| | | Status: This text explains the progress of the job "definition of the product" of the project ALPHA according to JPL | | | |
| ML | | 1.4 Marketing | | Job | 10% |
| JPL | | | | Job | 20% |
| | | Status: This text explains the progress of the job "marketing" of the project ALPHA according to JPL | | | |
| ML | | > Contact Distributor | | Job | 0% |
| | | Status: This text explains the progress of the job "marketing" of the project ALPHA | | | |

-continued

| | | | | |
|---|---|---|---|---|
| ML | ☐ | > General delay<br>This text emphasizes the delay in the marketing jobs, attributing the cause to the lack of qualified human resources and specifies the need to be met | PB/Resources | |

Below, it will be found an eighth example for presentation of a document summarizing the first document shown above in the previous tables, containing only the information of the highest or average priority, as it would appear on a computer screen. This presentation is always displayed here by an Internet navigation software program. The document contains meta-information, an indication of the organization of the presentation of the document, here "summarizing" and three zones for giving information elements, the first two involving the highest priority indicated in the fields "Priority" or "Priol" shown in the first table above, and the last one involving the average priority level indicated in the same fields according to the organization by category indicated in the same field, conforming to the organization by category indicated by the notice "view by priority Each information element corresponds, here as well, to a horizontal zone which extends into all zones of the category involved.

It is observed that the information elements are strictly identical to those in the table above, but their number has been modified in order to only retain the information relating to the high or average priorities.

A comparison function makes it possible to compare the information of different documents according to the same standard, by comparing the information that corresponds to the same titles. This comparison thus makes it possible to assess the differences between points of view of different authors of the reports and/or between successive reports that come from the same author.

In a preferred embodiment mode, the implementation of the method that is the object of the invention thus provides the following solutions:

| Problem, requirement | Solution |
|---|---|
| Cost of training, acceptability | Natural ergonomics of a text processor; gets rid of visual formatting for functions |
| Cost of inputting and formatting | The tool provides all formatting services (heading, indentation, numbering, page layout) |
| Heterogeneity, lack of completeness, risk of wrong | Implementation of standards, personalizable, contains both a inputting |

| File | Edition | Display | Favorite | Tools | ? |
|---|---|---|---|---|---|
| SYSTEAM | | | | Technical Management DT | |
| Report | TEST | Test Report | | | |
| Object | W28 | Week 28 | | | |
| From: | BRDEV | Group Project Beam-Report (ML) | | | |

Notes: SUMMARY

PROJECT ALPHA
CRITICAL

| | | | | | |
|---|---|---|---|---|---|
| ML | ☐ | 1. Project ALPHA - Marketing - General delay<br>This text emphasizes the delay in the marketing jobs, attributing the cause to the lack of qualified human resources and specifies the need to be met | PB/Resources | | |
| ML | ☐ | 2. Project ALPHA - Financing - Start over Devis Industrialization<br>This text states the reason for action demanded from the addressee of the report | RQ/Act | URG | |

NOTICES

| | | | | |
|---|---|---|---|---|
| ML | Δ | 3. Project ALPHA - Development - Bug in XML function interface<br>Impact: This text describes the consequences of the problem "Bug in the XML function interface"<br>This text explains JPL's solution to the problem "XML interface" | PB/Technical | |

The method that is the object of the invention thus makes it possible to standardize the content and the form of the reporting documents, to make easier their development and their use, and in the end, to improve the effectiveness of this communication.

It can be observed that the function of creating a summary can be done over criteria other than the priority, as indicated above, and allows, for example, creation immediately at the end of a meeting of a meeting report having, for example, only the information relating to the actions and the decisions, while keeping the content of the proceedings available during the meeting.

-continued

| Problem, requirement | Solution |
|---|---|
| interpretation | help and a content guide |
| Fear of restrictive or heavy standards (dread of forms) | Light standards, easy to modify, non-locking, and always the possibility of a free expression for what "doesn't fit in the cases." |
| Differences in points of view | Automatic functions of re-organization, making it possible to present a given |

| Problem, requirement | Solution |
|---|---|
| | content from several points of view (by subject, by category, by importance . . . ) |
| Chronological monitoring | Function for automatic comparison between two reports, with highlighting of the modifications |
| Consolidation of several reports | Function for automatic combination of several reports, with connections by subject. |
| Help in synthesis on one or more reports | Automatic generation of "summaries", according to personalizable criteria (defined in the standard) |

Other functions of the method that is the object of the invention are explained below but are not shown. The method that is the object of the invention can automatically display the differences between the current report and a reference report, on the basis of the "titles" of the information elements.

For each information element common to the two reports, the method shows the differences found on the fields other than the "title". It is noted that the absence of any difference over the entire text following a title is considered a priori as suspect, and is highlighted, for example, by automatic underlining. It is observed that this function can serve the editor as well as the addressee of the report: it can be activated continuously during the development of a report, allowing the editor to work in an incremental manner on the basis of his previous report.

The method that is the object of the invention has a hybrid character, being both a text editor and a database interface: the document managed is greatly structured, but the user sees it as a linear text (including during its development), and functions of a traditional text processing apply to it, which makes it very user-friendly and easy to use.

In FIG. 1, a step 800 is observed for defining a document standard which determines the general framework of the document in the form of a series of titles and/or conventional meanings and authorized values of certain notable information fields, as indicated above. During the step 800, for at least one title, a selection step is defined in the standard if the title can be modified by a user and the categories of information are defined. Later, the user and sender (called the "first" user) performs a step 802 for selecting a document standard to prepare the document. This selection can be done indirectly in selecting a document made in implementing the method that is the object of the invention. The standard itself appears as a document. Then, the user and sender performs step 804 for selecting information of the document and the standard.

During a step 806, it is determined whether, in the standard, the information selected can be edited (for example, a title or an information field called "notable", for example, information about category, percentage, priority). If the information selected is editable, a step 808 for editing the information by a complement (text, percentage, icon, context, including the parts of the standard that are editable for example) or by selecting a value for the notable field. During step 808, in at least one text zone, the titles defined by the standard and the text input by the user appear, like a single linear text, to be shown in the second to the seventh tables above. During step 808, the user/sender can modify the level of priority associated with the information input (by default, each information element is linked to the lowest priority level). During step 808, the program implementing the method that is the object of the invention automatically links (or after an identity request) an identification of the author to the information input.

Then one determines, during a determination step 810, if other information is selected. If yes, step 806 is re-started. If no, during step 812, one determines whether the user/sender demanded a transmission of the document to at least one user/addressee. If yes, the program performs a step 814 for transmission of information of the document to the at least one user/addressee (called "second user") during which one transmits preferentially the information of the document according to an accessible page format over an information network, for example, by using Internet navigator.

When the document has been received by a user/addressee, when the document is opened by this user/addressee, his computer performs a step 816 for reconstructing the document, by making a possible call to the document standard stored locally by this computer or remotely on another computer.

During step 818, one determines if the user/addressee has demanded a consolidation of documents. If no, step 822 is performed. If the consolidation demand is determined, during a step 820, the user/addressee selects at least one other document and the program implementing the method that is the object of the invention performs the consolidation of the document transmitted and each document selected. During this consolidation of documents, one juxtaposes under one unique title the information of the documents which are linked to the identical titles (i.e. the same order of titles and sub-titles, for example, in the seventh table "project alpha/development") in the different documents to be consolidated.

Next, the program determines, during step 822, if a request for re-organization, summarization or comparison has been made by the user/addressee. If no, step 826 is performed. If it is determined that a processing of the document is requested during step 822, the program performs step 824 for performing a requested processing as explained above. In order to determine a summary of the document, one selects the information depending on a hierarchy of information values, title level (for example, only the first level), notable information values (for example, priority or important categories). For the re-organization, during the selection step, you can select a hierarchy of information values depending on priorities, categories, or identifications of the authors of the documents.

Finally, the program performs step 826 to supply the document, for example, display or printing, according to the user/addressee's selection. As indicated above, in at least one text zone, the titles defined by the standard and the text input by the user appear as a single linear text.

It is noted that, during step 822, the user/sender selects a sorting criterion based on the document titles or on the notable fields.

Of course, the user/sender can perform the same consolidation, re-organization, selection of summary as the second user, and the second user can in turn modify the document transmitted or the document supplied. Though only a single supply operation is indicated, during the different steps, the user involved will see on his screen the document while it is processed.

It is understood that the implementation of the present invention increases the speed of creation, transmission, comprehension and processing of reports and thus of the supervision of the human organization which produces them, while increasing the readability or exploitability of these reports. These technical results are all the more important since the content of the reports are, totally or partially, reported in other reports, for example, in going up the hierarchical levels.

The invention claimed is:

1. A method for communicating structured information, between a first user and at least one second user, said method comprising:
    defining a document standard determining a general framework of the document comprised of:
    a series of fields of information comprising titles, information associated with titles and information for notifications, the information associated with titles being separate from the titles; and
    values authorized in fields of information, the step of defining being performed by said first user and second user, said first user providing said information, each second user receiving at least a portion of said information;
    the step of defining also defining at least one selection attribute associated with at least one field of information for enabling each second user to select information items from said document;
    inputting, by said first user, said information, the step of inputting being comprised of inputting one of text and titles to the general framework and selecting values authorized on said fields, the input information items being associated with at least one selection attribute based on the document standard;
    transmitting said document standard from said first user to storage for each second user;
    transmitting said information from said first user to storage for each secondary user;
    selecting, by each secondary user, a sorting criterion applicable to at least one selection attribute defined by the document standard;
    selecting information items of the document and re-organizing the selected information items of the document according to said sorting criterion and selection attributes associated with said information items; and
    supplying, to the secondary user, the selected information items of the document re-organized according to said sorting criterion;
    wherein each second user defines an identical document standard, and wherein each second user selects a separate sorting criterion corresponding to each second user independent from another second user.

2. The method according to claim 1, wherein said titles and the inputted text and titles appear as single linear text in at least one text zone, during the step of inputting and the step of supplying.

3. The method according to claim 1, wherein the step of defining said document standard comprises:
    modifying at least one title by said first user during the step of inputting; and
    selecting the modified title by the second user during the step for selecting said sorting criterion.

4. The method according to claim 1, wherein the step of inputting comprises:
    modifying at least one part of said document standard after the step of defining by said first user.

5. The method according to claim 1, wherein the step for defining said document standard further comprises:
    defining selection attributes by categories of information, said sorting criterion being based on said categories of information,
    wherein, during the step of selecting and reorganizing, information items of the document are selected and re-organized according to the categories of said information items.

6. The method according to claim 1, wherein the step of defining said document standard comprises defining selection attributes by priority levels and the step of inputting is further comprised of:
    associating a priority level with the information items,
    wherein the step of selecting is comprised of selecting a hierarchy of information based on said priority level of the information, and
    during the step of selecting and reorganizing, information items of the document are selected and re-organized according to the priority levels of said information items.

7. The method according to claim 1, wherein the step of transmitting comprises:
    forming the information according to an accessible page format over an information network, readable using a web navigator and printable from any office work station equipped with a web navigator and a printer.

8. The method according to claim 1, further comprising:
    consolidating documents, wherein information of the documents linked to identical titles are juxtaposed under a unique title for different documents.

9. The method according to claim 1, said method further comprising:
    determining a summary of the document, the information being selected as a function of a hierarchy of information values.

10. The method according to claim 1, wherein the step of inputting comprises:
    allocating an identification of an author of the information, and
    wherein the step of selecting comprises:
    selecting a hierarchy of information values based on identification of said author.

11. The method according to claim 1, wherein the document contains all titles and information input by said first user during the step of supplying.

12. The method according to claim 1, wherein the second user modifies the content of the document to give it added value.

13. The method according to claim 1, wherein the titles have a hierarchical ordering, in each decreasing level of the hierarchy an information element of a previous level of the hierarchy to be displayed is shown.

14. The method according to claim 13, wherein each level of the hierarchy of titles comprises the information element of a parent level of the hierarchy of titles.

15. The method according to claim 13, wherein a title for each level of the hierarchy of titles is supplied by the first user providing the text.

16. The method according to claim 13, wherein upon a level of the hierarchy of titles being removed from the hierarchy of titles the removed level must be fixed at a new position within the hierarchy of titles.

17. The method according to claim 13, wherein the hierarchical ordering of titles provides filiation of each information element along the hierarchy, upon the information element no longer being visible in the order of presentation.

18. A device for communicating structured information between a first user and at least one second user, said device comprising:
    a computer programmed with software comprising:
        means for semantically defining a document standard, being suitable for determining a general framework of the document comprised of:
        a series of fields of information comprising titles, information associated with titles and information of notifications, the information associated with titles being separate from the titles;

at least one selection attribute associated with at least one field of information for enabling each second user to select information items from said document; and values authorized in fields of information;

means for inputting by a first terminal from said first user, information to be provided by inputting one of text and titles to the general framework and by selecting values authorized on said fields, the input information items being associated with at least one selection attribute based on the document standard;

means for transmitting said document standard from said first user to storage for each second user;

means for transmitting the information from said first user terminal to storage for access by each second terminal of each second user;

means for selecting, by each secondary user terminal of the second user, a sorting criterion applicable to the selection attributes defined by of the document standard;

means for selecting information items of the document and re-organization of the selected information items of the document according to said sorting criterion set by the means for selecting a sorting criterion and according to the selection attributes associated with said information item; and means for supplying, to each second terminal, the selected information items of the document reorganized according to each sorting criterion, wherein the means for defining said document standard is determined by said first user and each second user, said document standard being identical for said first user and each second user, each second user having a separate sorting criterion corresponding to each second user independent from another second user.

19. The device according to claim 18, wherein the means for defining said document standard are adapted to define selection attribute by categories of information, said sorting criterion being based on said categories of information wherein the means for selecting and reorganizing selects and reorganizes information items of the document according to the categories of said information items.

20. The device according to claim 18, wherein the means for defining said document standard are adapted to define selection attribute by priority levels, the means for inputting further comprises means for associating a priority level with the information items, wherein the means for selecting are adapted to select a hierarchy of information based on said priority level of the information and wherein the means for selecting and reorganizing selects and reorganizes information items of the document according to the priority level of said information items.

\* \* \* \* \*